United States Patent [19]

Balzer et al.

[11] Patent Number: 4,514,014
[45] Date of Patent: Apr. 30, 1985

[54] INTEGRAL IDLER TRACK ADJUSTING AND RECOIL APPARATUS

[75] Inventors: David J. Balzer, East Peoria; Thomas M. Dennison, Peoria; Marvin G. Getz; Eldon D. Oestmann, both of Morton, all of Ill.

[73] Assignee: Caterpillar Tractor Co., Peoria, Ill.

[21] Appl. No.: 388,765

[22] PCT Filed: Apr. 26, 1982

[86] PCT No.: PCT/US82/00545
§ 371 Date: Apr. 26, 1982
§ 102(e) Date: Apr. 26, 1982

[51] Int. Cl.³ .............................................. B62D 55/30
[52] U.S. Cl. ........................................ 305/10; 305/31; 305/32
[58] Field of Search .................. 305/10, 22, 29, 31, 305/32

[56] References Cited

U.S. PATENT DOCUMENTS

| 1,684,070 | 9/1928 | Pennington. | |
|---|---|---|---|
| 1,926,244 | 9/1933 | Sargent | 305/32 |
| 2,377,232 | 5/1945 | Herold | 301/133 |
| 2,416,679 | 3/1947 | Curtis | 305/32 X |
| 3,013,843 | 12/1961 | Sinko | 305/10 |
| 3,329,227 | 7/1967 | Nodwell et al. | 180/9.6 |
| 3,477,766 | 11/1969 | Linsay | 305/10 |
| 3,671,088 | 6/1972 | Woolley | 305/7 |
| 3,901,563 | 8/1975 | Day | 305/10 |

FOREIGN PATENT DOCUMENTS

| 164567 | 6/1921 | United Kingdom | 305/32 |
|---|---|---|---|
| 125142 | 6/1959 | U.S.S.R. | 305/10 |

Primary Examiner—Charles A. Marmor
Attorney, Agent, or Firm—Wegner, McCord, Wood & Dalton

[57] ABSTRACT

In a track laying vehicle (10) a track tensioning apparatus wherein a track engaging idler (20) wheel is mounted to a cross member (82) for adjustment to tension the track by a piston (68) and cylinder (62). The cross member (82) is in turn adjustably (106) mounted to opposing sides (26,27) of the vehicle track frame. Acting in conjunction with the track tensioning apparatus an accumulator (130,146) is provided and is in fluid communication with the piston (68) and cylinder (62). The accumulator (130,146) exerts a backpressure upon the fluid so that the idler (20) may recoil in response to excessive tension or shock upon the track.

4 Claims, 4 Drawing Figures

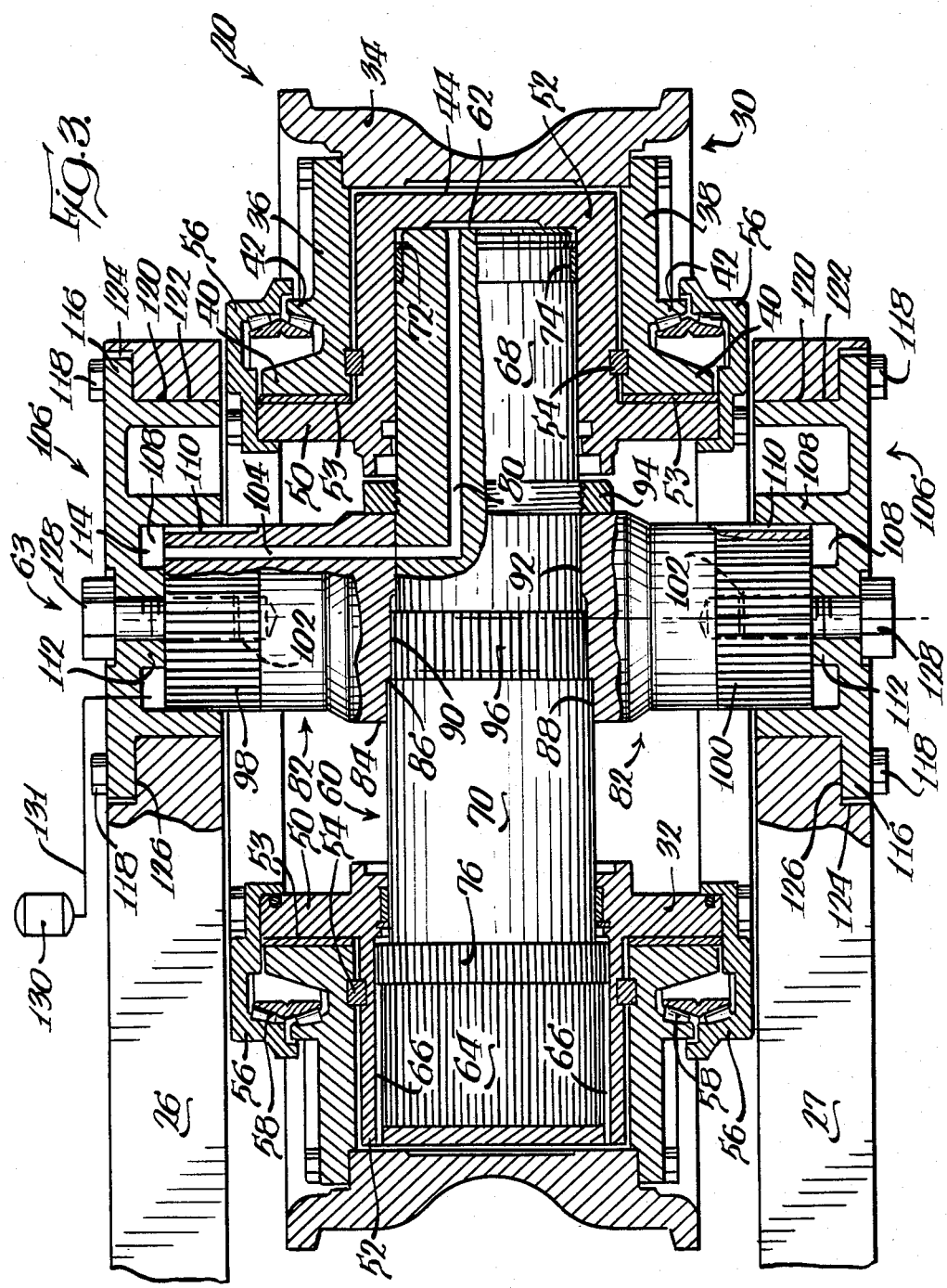

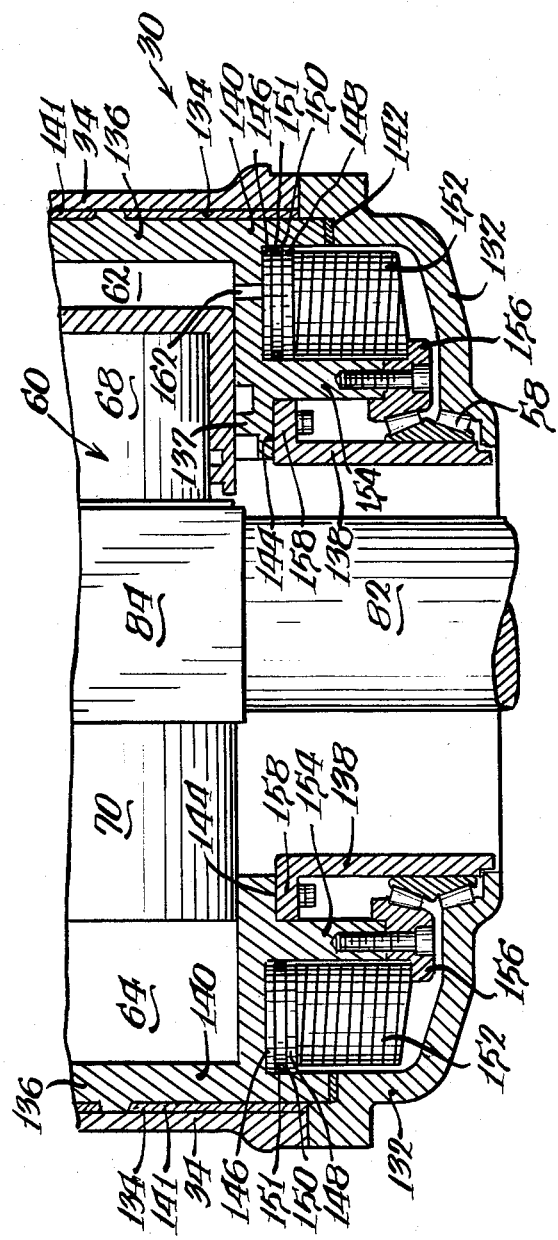

INTEGRAL IDLER TRACK ADJUSTING AND RECOIL APPARATUS

TECHNICAL FIELD

This invention relates to adjusting and recoil apparatus and in particular to such apparatus for use with crawler vehicle tracks.

BACKGROUND ART

In the conventional crawler-type vehicles, the undercarriage and the track chain, are subject to substantial wear as a result of the severe operating environment. Such wear, in turn causes slack to occur in the track chains. To accommodate the wear and resultant slack, idler wheels are utilized which are periodically adjusted to take up the slack and properly tension the track. Failure to take up the slack not only causes accelerated track wear, but may also cause loss of the track chains as for example, during the turning of the vehicle.

While a number of manually operated track adjusting apparatus have been developed, these have not proven completely successful. Access for manual adjustment is often hindered by the adverse environmental conditions such as the coating of the undercarriage with layers of mud or ice. One type of manually operated adjusting apparatus is disclosed in U.S. Pat. No. 3,013,843, issued Dec. 19, 1961 to Sinko. In this type of adjustment apparatus the idler is rotatably held by a support having at one end a piston, the support being held by a stationary housing having a cylinder to accept the piston. Grease is forced through a fitting into the piston and cylinder interstice resulting in adjustment of the idler with respect to its stationary support.

Another problem in the use of track chain systems is the occasional excessive tension incurred by the track chain as when foreign matter, such as rocks and the like, are drawn between the rack and the elements supporting it. The forces generated by the excessive track tension tends to damage the chain or elements of the system supporting the track chain particularly those elements associated with the idler. Along these lines still another problem encountered is the substantial forces generated by the track chain against the front idlers when the vehicle is being operated in reverse.

Accordingly, various types of recoil apparatus have been developed the most common of those being the use of large, expensive recoil springs. A departure from the simple use of a recoiling spring is found in U.S. Pat. No. 3,901,563, issued Aug. 26, 1975 to Day. Apparatus of this type and the like provide for the idler to be hydraulically adjusted to properly tension the track and enable the idler, by porting of the hydraulic fluid, to recoil. However, the required elaborate porting of the fluid and the use of a horsepower consuming hydraulic motor detract from its commercial utility.

The present invention is directed to overcoming one or more of the above problems set forth above.

DISCLOSURE OF THE INVENTION

In one aspect of the present invention, an improved idler adjusting and track tensioning apparatus is provided which avoids certain disadvantageous features found in track tensioning apparatus heretofore used. This improved idler adjusting and track tensioning apparatus extends the in-service use of the vehicle by lengthening the periods between removal of track links or the replacement of the entire track chain.

The track tensioning apparatus has a track engaging idler rim, mounted by adjusting means including a piston and cylinder, to a cross member which is adjustably mounted to the vehicle. The combined adjustment of the idler upon the cross member and the position of the cross member on the vehicle enables the idler to be adjusted to take up greater amounts of slack in the track for proper tensioning thereof.

In another aspect of the invention, the aforementioned idler adjusting means is combined with a recoil means integral to the idler which does not use or require large expensive springs, complicated porting of fluids or horsepower consuming hydraulic motors.

The recoil means, in combination with the adjusting means, provides an accumulator communicating with the piston cylinder arrangement of the adjusting means. The accumulator, as the idler moves to respond excessive tension upon the track chain, receives fluid from the cylinder of the adjusting means and exerts a back pressure thereon. Upon release of the excessive tension on the track chain the back pressure of the accumulator forces the fluid to return into the piston and cylinder interstice thereby returning the idler in a recoiling fashion to its original adjusted position.

The aforementioned integral idler adjusting and recoil apparatus provides for adjustment of the idler to take up track slack, and provides a self-contained means to recoil in response to excessive tension upon the track chain and the release thereof.

BRIEF DESCRIPTION OF THE DRAWINGS

FIG. 3 is a plan view of the idler illustrating the adjustment and recoil apparatus; and FIG. 4 is a fragmentary plan view of the idler illustrating a further embodiment of the idler recoil apparatus.

BEST MODE FOR CARRYING OUT THE INVENTION

Figure 1:
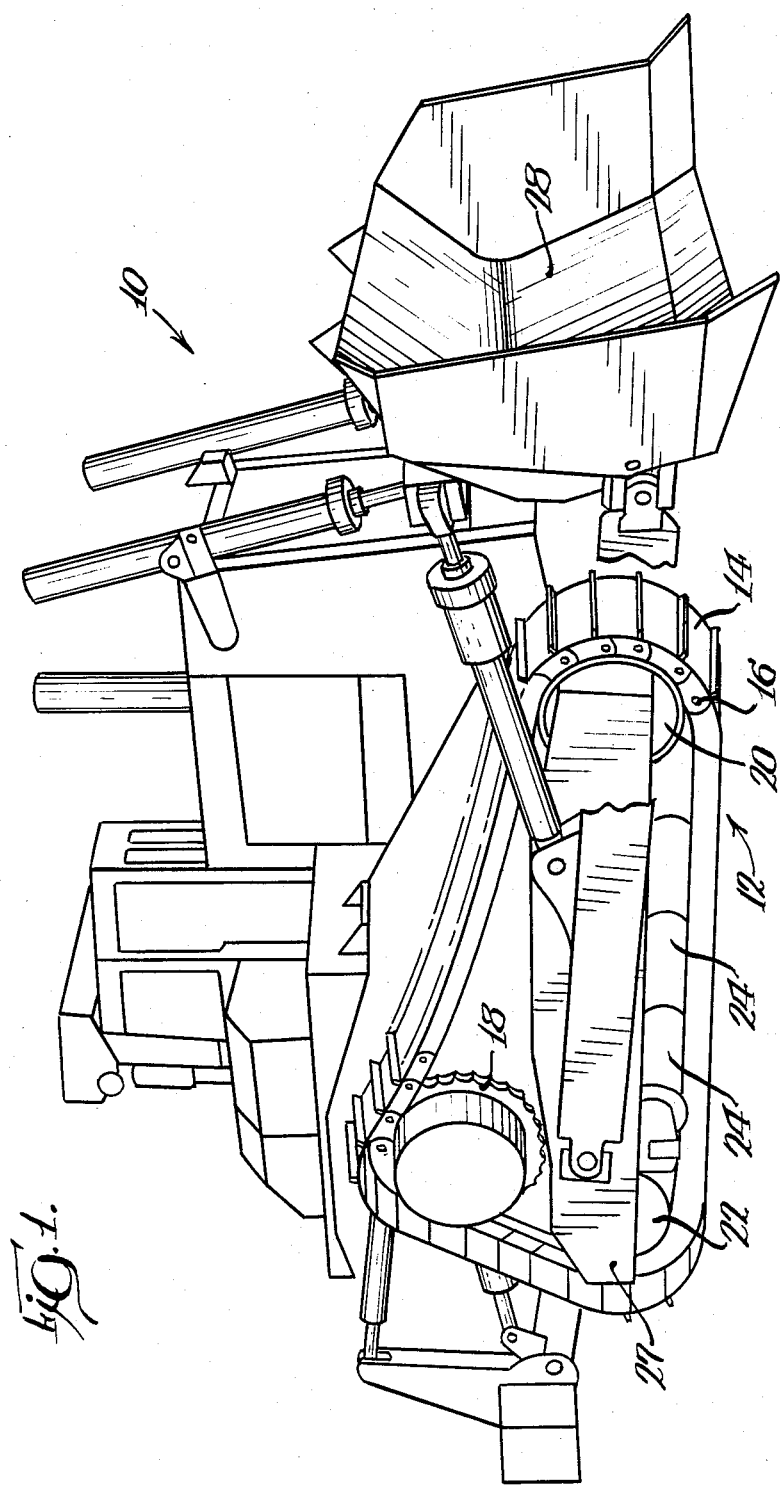
FIG. 1 is a side view of a crawler vehicle incorporating the track adjusting and recoil apparatus of this invention.

Turning to FIG. 1 a crawler-type vehicle 10 is shown which incorporates the idler adjustment and recoil apparatus of this invention. The vehicle 10 has disposed on both sides an endless track assembly 12, only one of which is shown, consisting of ground engaging track shoes 14 linked together by a series of links 16. Each track assembly 12 is supported for rotation relative to the vehicle 10 by a drive sprocket 18 which meshes with and drives the track assembly 12, front and rear idlers 20 and 22 and a plurality of track rollers 24. The front and rear idlers 20 and 22 and track rollers 24 are supported by inboard and outboard track frames 26 and 27 (only the outboard track frame 27 is shown in FIG. 1) which may also, as shown in FIG. 1, provide support for a vehicle implement 28.

Figure 2:
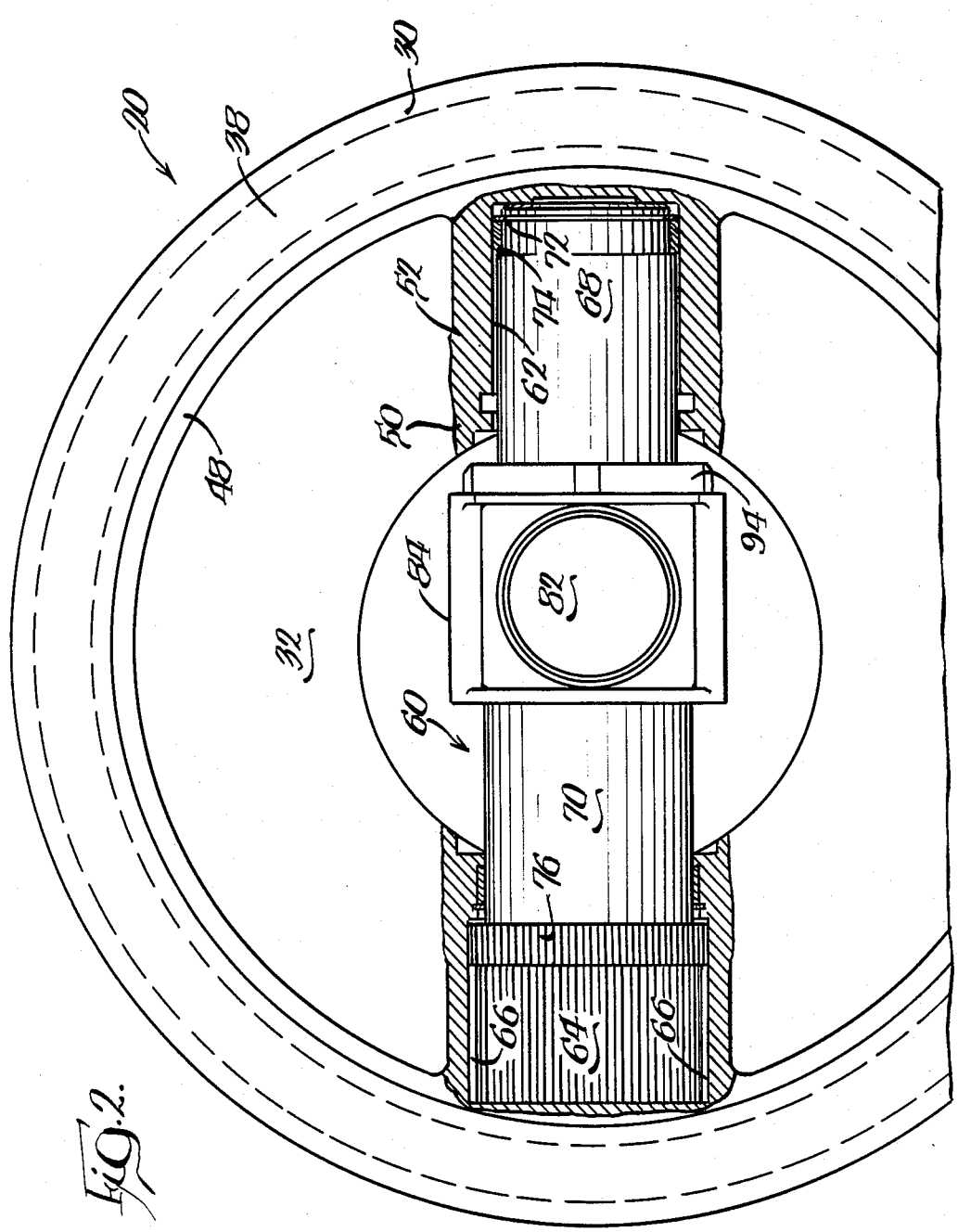
FIG. 2 is a fragmentary side elevation of the idler of the present invention.

Turning to FIGS. 2 and 3 an embodiment of the front idler 20 is shown in more detail. Since both of the front idlers 20 are identical, the following discussion will be limited to one such front idler 20.

The front idler 20 provides rolling support and guidance for the traveling track assembly 12. Accordingly the front idler 20 has a peripheral rolling rim assembly 30, supported by an idler frame 32, to bear against and roll with the track assembly 12. To properly support and guide the track assembly 12, the rim assembly 30 has an outer circumferential rim 34 mounted, as by bolts, to a pair of annular inboard and outboard rim support portions 36 and 38. As seen in FIG. 3 each of the inboard and outboard rim support portions 36 and 38 have, opposing the rim 34, a bearing support 40 and a boss 42. Together with the rim 34, the inboard and outboard rim support portions 36 and 38 describe a cylindrical race 44.

Rollably supporting the rim assembly 30, the idler frame 32 has a peripheral rim mount 48 which consists of an inner housing 50 and an outer ring 52, the outer ring 52 being located in the race 44. Disposed between the inner housing 50 and the bearing supports 40 of the inboard and outboard rim support portions 36 and 38, are a plurality of first bearings 53. The bearings 53, in cooperation with a plurality of second bearings 54 interposed between the ring 52 and the inboard and outboard rim support portions 36 and 38, journal the rim assembly 30 about the idler frame 32. Attached to the housing 50, as by bolts, are a plurality of seal mounts 56 which support, in cooperation with a boss 42, a plurality of duo-cone seals 58. The duo-cone seals 58 prevent particulate material from coming in contact with the bearings which would accelerate their wear.

Providing a means to mount the idler frame 32 to the vehicle 10 for adjusting of the tension of the track assembly and for recoil, the front idler 20 has a mounting member 60 horizontally spanning and received by the idler frame 32. As seen in FIG. 3 the idler frame 32 has a forward and a rear cylinder 62 and 64, respectively, to accommodate the mounting member 60. The forward cylinder 62 extends horizontally within the housing 50 and substantially into the ring 52. The opposing rear cylinder 64 is somewhat larger in diameter than the front cylinder 62 and likewise extends substantially into the ring 52. Splines 66, the purposes of which will become evident, extend longitudinally along the wall of the rear cylinder 64.

The mounting member 60 has one end defining a piston 68 opposed by the other end which constitutes a rear guide 70. The piston 68 is slidably received by the forward cylinder 62 and has at its extremity a piston ring 72 and seal 74 to seal the piston 68 within the forward cylinder 62 for relative movement therein.

The rear guide 70, being somewhat larger in diameter than the forward piston 68 has at its rearmost end a head 76 which is closely received by the rear cylinder 64. Splines about the periphery of the head 76 are received by the splines 66 of the rear cylinder 64 to slidably guide the relative movement of the idler frame 32 upon the mounting member 60.

From the above it follows that the idler frame 32, and its rim assembly 30, can move relative to the mounting member 60 either forward (to the right in FIG. 3) to take up slack and tension the track assembly 12 or to the rear to slacken and reduce the tension of the track assembly 12. This relative positioning of the idler frame 32 upon the mounting member 60 is facilitated by an adjusting port 80 extending through the side of the piston 68, and longitudinally exiting from the extremity thereof. Through the adjusting port 80 an incompressible fluid such as grease can be injected into the piston 68 and forward cylinder 62 interstice thereby determining the relative position of the idler frame 32 upon the mounting member 60.

To provide a means for adjustably supporting the mounting member 60 upon the vehicle 10, and more particularly the inboard and outboard track frames 26 and 27, the front idler 20 has a cross member 82. As viewed in FIGS. 2 and 3 the cross member 82 has a central section 84 with a horizontal, transverse aperture 86 therethrough. The aperture 86 has a rearmost bore 88 to closely receive the rear guide 70, a medial splined bore 90, and a lesser diameter, forwardmost bore 92 to receive the forward piston 68.

To secure the mounting member 60 to the cross member 82, the mounting member 60 is received by the aperture 86 and fastened therein against horizontal movement by a nut 94 threaded upon the forward piston 68 and tightened against the central section 84. Medial splining 96 on the mounting member 60 mates with the splined bore 90 of the aperture 86 thereby preventing rotation of the mounting member 60 within the aperture 86.

The ends of the cross member 82 designating inboard and outboard ends 98 and 100 respectively, are cylindrical and have circumferential splining. Axial threaded bores 102 extend into the inboard and outboard ends 98 and 100 for securing the cross member 82, by means hereinafter described, to the inboard and outboard track frames 26 and 27. A supply port 104 extending longitudinally through the inboard end 98 registers with the adjusting port 80.

To adjustably mount the cross member 82 to the vehicle 10, a pair of reversible brackets 106 are provided. As best seen in FIG. 3 each of the brackets 106 has a thickness corresponding to that of the inboard and outboard track frames 26 and 27 and has an off-center or eccentric splined bore 108 to closely receive the inboard and outboard ends 98 and 100 of the cross member 82. A pair of cylindrical bosses 112, each having an axial bore therethrough, protrude coaxially into the bores 108 to abut the inboard and outboard ends 98 and 100. As seen in FIG. 3, boss 112 associated with the inboard end 98 of the cross member 82, in cooperation with the inboard end 98 defines a chamber 114 which is in communication with the supply port 104.

Each bracket 106 has a planar, peripheral lip 116 with a plurality of bores therethrough to receive mounting bolts 118. To accommodate the reversible mounting of the brackets 106, the pattern of the mounting bolts 118 should be in a mirrored relationship about an imaginary vertical line drawn through the center of the bracket 106.

In order to reversibly secure the brackets 106 to the vehicle 10, the inboard and outboard track frames 26 and 27 have frontal, bracket receiving, receptacles 120 extending therethrough. Each receptacle 120 has a countersink 124 which, in cooperation with the receptable 120 defines a seat 126. A plurality of threaded bores are sunk into the seat 126 to register with the bores in the bracket lips 116.

From the above it follows that the cross member 82 may be secured, by employing the brackets 106, to the inboard and outboard frames 26 and 27 in one of two positions. In the rear position as depicted in FIG. 3 the brackets 106 are mounted to the inboard and outboard frames 26 and 27 so as to rearwardly locate the bracket bore 108. The cross member 82 is in turn secured to the brackets 106 by a pair of threaded lugs 128 which pass inward through the brackets 106 and their bosses 112 and into the cross members threaded bores 102. Tightening the lugs 128 firmly mounts the cross member 82 to the brackets 106 and to the vehicle 10. To relocate the cross member 82 in a forward position, the bolts 118 are removed and lugs 128 are loosened. The brackets 106 are freed from the cross member ends 98 and 100, rotated 180°, and then replaced on the cross member 82 which, in turn, disposes the eccentric bracket bore 108 and the cross member 82 forwardly on the vehicle 10. Re-inserting and tightening the bolts 118 and lugs 128 firmly secures the front idler 20 to the vehicle 10.

Recoil means 63 is provided, enabling the front idler 20 to recoil. This recoil means 63 includes a pressurized accumulator 130 mounted on the vehicle 10. The accumulator 130 is at least partially filled with oil or some other incompressible fluid, the remainder of the accumulator 130 containing pressurized gas. A conduit 131 provides fluid flow communication between the chamber 114 and the accumulator 130.

In the event that the vehicle passes over a rock or the like, the excessive tensioning of the track assembly 12 causes the rim assembly 30, rim mount 48 and remainder of the idler frame 32 to move rearwardly in response thereto. As a result, the forward cylinder 62 moves toward the piston 68 forcing the fluid therebetween through the adjusting port 80 and supply port 104 into the already fluid filled chamber 114. This in turn displaces the fluid in the chamber 114 resulting in flow in the conduit 131 into the accumulator 130 against the backpressure offered by the compressed gas therein. Upon relaxation of the rock imposed track tension, the backpressure subsisting in the accumulator 130, returns fluid through the conduit 131 and into the chamber 114 which, in turn, returns fluid into the piston 68 and forward cylinder 62 interstice. The foregoing causes the idler frame 32, rim mount 48 and rim assembly 30 to recoil in the forward direction to maintain the properly adjusted track assembly 12 tension.

Turning to FIG. 4 another embodiment of the front idler 20 is shown. Like parts have the same reference numerals.

The rim assembly 30 has a track assembly engaging rim 34 to which is secured, on either side, arcuate and circumferential inboard and outboard rim support portions 132 (only one of which is shown in FIG. 4). Together the rim 34 and the inboard and outboard rim support portions 132 define a cylindrical race 134.

Supporting the rim assembly 30 is the idler frame 32 having a rim mount 136 supported by an inner housing 137. A pair of inner members 138 (only one shown in FIG. 4) are, in turn, secured to a pair of opposing annular seats 144 (only one shown in FIG. 4) on either side of the inner housing 137 as by bolts. The rim mount 136 is received by the race 134 and has an outer cylindrical surface 140 supporting a plurality of first bearings 141 to journal the rim assembly 30 thereabout. A plurality of second bearings 142 disposed between the surface 140 and the inboard and outboard rim support portions 132 additionally contribute to the journalling of the rim assembly 30. Medially located about the circumference of the inner housing 137 on one side thereof is a channel which defines an annular accumulator 146 having disposed therein an annular piston 148. The annular piston 148 has a ring groove 150 which receives an O-ring 151 to slidably seal the annular piston 148 within the annular accumulator 146. Biasing means, such as an annular spring 152 bias the annular piston 148 toward the closed end of the annular accumulator 146 the purposes of which will hereinafter become evident.

Forming the inner wall of the annular accumulator 146 is a cylindrical boss 154. A like boss (not shown) is similarly disposed on the opposing side of the inner housing 137. Secured to each boss 154 by a plurality of bolts is a ring 156. Each ring 156 functions as a seal mount to, as described above, rollably seal the rim assembly 30. Additionally the ring 156 associated with the annular accumulator 146 acts as a retainer to hold the annular spring 152 within the annular accumulator 146.

The inner members 138 (only one shown in FIG. 4) are generally cylindrical having at one end thereof a radially outwardly extending lip 158 through which bolts pass, as described above, to secure the inner members 138 to the annular seat 144. Opposing the annular lip 158, the inner members 138 support a plurality of duo-cone seals 58. The seals 58 interposed between the inner members 138 and the rings 156 cooperate therewith to prevent particulates from coming in contact with the bearings or entering the annular accumulator 146.

Disposed within the idler frame 32 are the forward and rear cylinders 62 and 64. As seen in FIG. 4 a port 162 provides communication between the annular accumulator 146 and the forward cylinder 62. The remainder of the idler 20 is generally identical to that previously described.

In this embodiment of the idler 20, adjustment of the tension of the track assembly 12 is accomplished in the same fashion as described above. Accordingly grease, passing through a supply port 104 and adjusting port 80 (not shown in FIG. 4) may be interposed between the piston 68 and forward cylinder 62 thereby locating the idler frame 32 and its rim assembly 30 either forwardly, to tension the track assembly 12, or rearwardly to relax tension. Additional slack may be taken up by reversibly mounting the brackets 106 (also not shown in FIG. 4) which secure the mounting member 60, including the piston 68 and guide 70, and the supporting cross member 82 to the vehicle 10.

To provide the recoil function of the front idler 20, the annular spring 152 exerts a bias upon the annular piston 148. Excessive tension or shock upon the track assembly 12 forces grease or other incompressible fluid from the forward cylinder 62 through the port 162 and into the annular accumulator 146. This in turn causes the annular piston 148 to move within the annular accumulator 146 against the back pressure offered by the bias of the annular spring 152. Upon release of the excessive tension or shock the annular spring 152 returns the annular piston 148 to its original position forcing the displaced incompressible fluid back through the port 162 and into the forward cylinder 62 causing the idler frame 32 and rim assembly 30 to return to its adjusted position.

INDUSTRIAL APPLICABILITY

From the above the operation of the integral idler track adjusting and recoil apparatus of this invention is apparent. When a new track assembly 12 or a worn track assembly 12 wherein a link or links have been removed is first positioned on the vehicle 10 the brackets 106 and the position of the idler frame 32 upon the mounting member disposes the rim assembly 30 and its rearmost position on the vehicle 10. As wear on the track assembly 12 proceeds the idler frame 32 and its rolling rim assembly 30 are suitably adjusted forwardly on the vehicle 10 by the interposing of additional grease in the piston 68 and forward cylinder 62 interstice. This may be done automatically by maintaining the accumulator 130 at a pressure corresponding to proper track tension or, for the second embodiment, proper selection of initial compression of the annular spring 152 when grease is initially introduced into the assembly. When the maximum amount of track assembly tensioning offered by the adjustment of the idler frame 32 upon the mounting member 60 is achieved the grease in the piston 68 and forward cylinder 62 interstice is removed and the brackets 106 are reversed to forwardly displace the front idler 20 upon the inboard and outboard track frames 26 and 27. Thereafter additional wear of the track assembly 12 may again be obtained by the injection of grease into the forward cylinder 62 and piston 68 interstice.

The recoiling of the front idler 20 in conjunction with the adjustment thereof as set forth above, enables the front idler 20 to move rearwardly in response to and recoil from excessive tension or shock observed by the track assembly 12. Furthermore, for both embodiments of the recoil means of this invention, the tension as described above and the amount of recoil may be adjustably determined by either the amount of pressurization of the accumulator 130 or the compression of the spring 152.

We claim:

1. In a track laying vehicle (10) of the type having a continuous track assembly (12) driven about a track frame (26, 27), an idler (20) engaging said track assembly 912), a cross member (82) connected to said frame (26, 27) and extending into said idler (20), means for adjusting the position of the idler (20) to tension the track assembly (12) and recoil means for providing recoil to said idler (20), the improvement comprising:
   said adjusting means (68, 62) including a piston (68) and a cylinder (62) within said idler (20) and being adapted to adjustable journal said idler (20) to said cross member (82), said adjusting and recoil means includes means (80) for interposing fluid between said piston (68) and cylinder (62) and adjusting the relative position of said idler (20) relative to said cross member (82), and an accumulator (146) in fluid communication with said cylinder, said accumulator (146) being annular and further including a piston (148) adapted to be displaced within said accumulator (146) in response to receipt of fluid from said cylinder (62), said piston (148) being biased to return fluid into said cylinder (62).

2. An undercarriage adapted to use in a track laying vehicle (10), comprising:
   a track frame having opposed sides (26, 27);
   a continuous track assembly (12) disposed about said track frame (26, 27);
   means (18, 20, 22, 24) for supporting and driving said track assembly (12) in a predetermined path about said track frame (26, 27), said means (18, 20, 22, 24) including an idler (20);
   a cross member (82) extending between and connected to each of said track frame opposed sides (26, 27);
   a mounting member (60) connected to said cross member (82);
   an idler frame (32) mounted on said mounting member (60), said idler frame (32) and said mounting member (60) being adapted to free said idler frame (32) for movement along said mounting member (60) in a direction transverse said cross member (82);
   an idler rim assembly (30) supported by and adapted for rotation about said idler frame (32), said rim assembly (30) engaging said track assembly (12); and
   means (62) for biasing said idler frame (32) in a first direction along said mounting member (60) and for freeing said idler frame (32) for recoil in a second opposed direction along said mounting member (60),
   said mounting member (60) including a piston (68) and said idler frame (32) defining a cylinder (62) adapted to receive said piston (68), movably mount said idler frame (32) on said mounting member (60), and biasing said idler frame (32) in response to introducing fluid into said cylinder (62); said frame and recoil means (63) including an accumulator (130, 146) associated with said idler frame (32), said accumulator (130, 146) being in fluid communication with said cylinder (62) and adapted to receive and return fluid to said cylinder (62),
   said accumulator (146) being annular and contained within said idler frame (32), said accumulator (146) receiving a piston (148) and said piston (148) being biased to urge fluid to said cylinder (62).

3. In a track laying vehicle (10), a track undercarriage apparatus comprising:
   an elongate track frame (28, 27);
   a continuous track assembly (12) disposed about said track frame (26, 27);
   means (18, 20, 22, 24) for engaging said track assembly (12) and mounting siad track assembly (12) for movement in a predetermined Path about said track frame (26, 27), said engaging and mounting means (18, 20, 22, 24) including an idler (20) disposed at one end of said track frame (26, 27);
   a cross member (82) extending into said idler (20);
   means for journalling said idler (20) on said cross member (82);
   means (60, 62, 68) freeing said idler (20) for adjustment of the position of said idler (20) relative to said cross member (82) in a direction substantially parallel to the longitudinal axis of said track frame (26, 27);
   said adjusting means including a piston (68) and cylinder (62) adapted to adjust track (12) tension in response to fluid being introduced into the piston (68) and cylinder (62) interstice; and recoil means (63) including an accumulator (130, 146) in fluid communication with said piston (68) and cylinder (62) interstice,
   said accumulator (146) being annular and contained within said idler (20).

4. The track undercarriage apparatus described in claim 3 further including a piston (148) disposed within said annular accumulator (146), said piston (148) being movable in a first direction in response to fluid being received by said annular accumulator (146) and said annular piston (148) being biased to return fluid to said piston (68) and cylinder (62) interstice.

* * * * *